Nov. 8, 1960  H. O. BENDER  2,958,952
ADAPTOR FOR MAGNETIC WHEEL TESTING DEVICE
Filed March 24, 1958
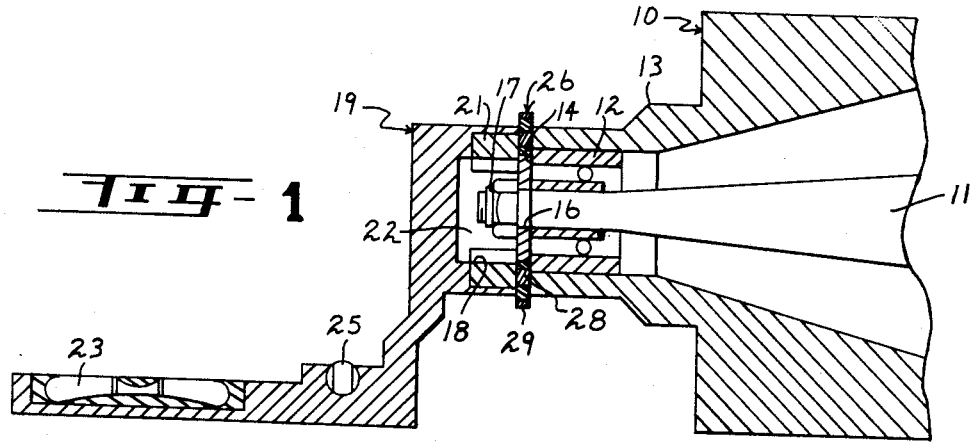
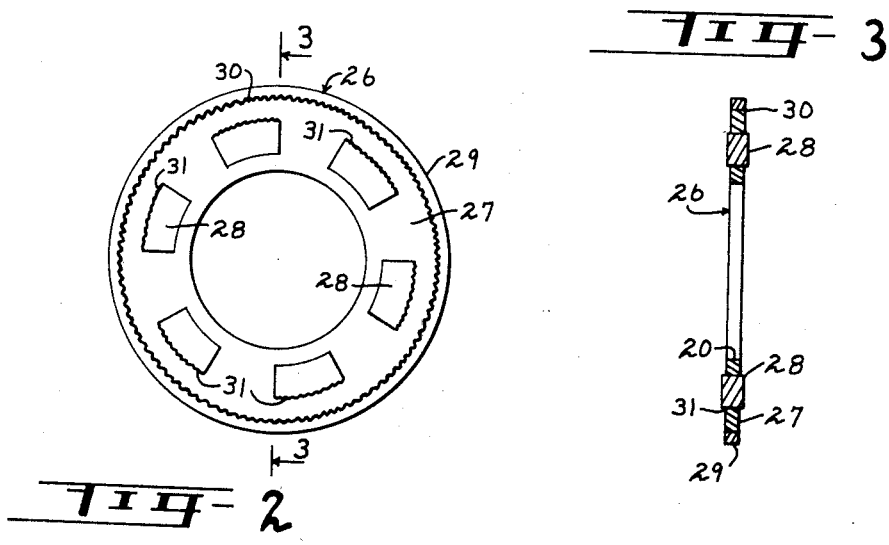
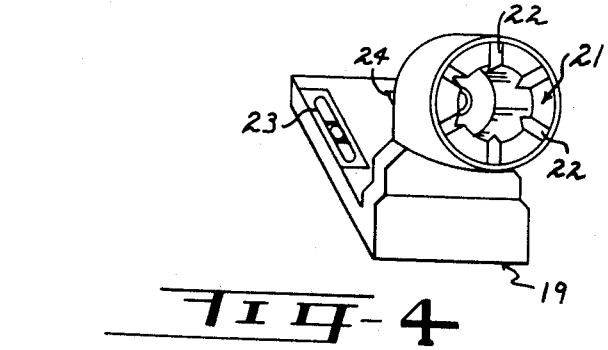
INVENTOR.
Houston O. Bender
BY
Jennings, Carter & Thompson
Attorneys United States Patent Office 2,958,952
Patented Nov. 8, 1960

2,958,952
ADAPTOR FOR MAGNETIC WHEEL TESTING DEVICE

Houston O. Bender, 2315 N. 26th St., Birmingham, Ala.

Filed Mar. 24, 1958, Ser. No. 723,290

1 Claim. (Cl. 33—203.18)

This invention relates to an adaptor for a wheel testing device of the type having angularly spaced magnetic elements for supporting the wheel testing device from the outer end face of the hub of a spindle mounted wheel.

An object of my invention is to provide an adaptor for magnetic wheel testing devices of the character designated in which the loss of magnetic power is reduced to a minimum.

A further object of my invention is to provide an adaptor of the character designated which shall be simple of construction, economical of manufacture and one which is adapted for use with a spindle mounted wheel having hubs and washers associated therewith of various sizes.

As is well known in the art to which my invention relates, some spindle mounted wheels are provided with relatively large washers whereby the conventional type wheel testing device cannot be applied directly to the outer end face of the wheel hub. More particularly, the washer is so large that it will not enter the space defined between the angularly spaced magnetic elements for the wheel testing device, thus preventing the machined end of the wheel testing device from coming in direct contact with the outer end face of the wheel hub. Accordingly, it is necessary to provide an adaptor between the outer end face of the wheel hub and the angularly spaced magnetic elements whereby the adaptor forms an extension for the magnetic members to thus support the wheel testing device from the outer end face of the wheel hub. While various forms of adaptors have been devised, such adaptors with which I am familiar have been unsatisfactory due to the great loss of magnetic power.

To overcome the above and other difficulties, I provide an adaptor in which there is practically no magnetic loss of power. Briefly, my improved adaptor comprises a non-magnetizable member which fits between the outer end face of the wheel hub and the magnetic elements of the wheel testing device. The non-magnetizable member carries a plurality of angularly spaced magnetizable elements which project outwardly thereof in position to engage the magnetic elements on the wheel testing device and the outer end face of the wheel hub whereby the magnetizable elements carried by the non-magnetizable member form extensions for the magnetic elements carried by the wheel testing device.

A device embodying features of my invention is illustrated in the accompanying drawing in which:

Fig. 1 is a vertical sectional view showing my improved adaptor associated with the outer end face of a wheel hub and the angularly spaced magnetic elements carried by a wheel testing device;

Fig. 2 is a side elevational view of my improved adaptor;

Fig. 3 is a sectional view taken generally along the line 3—3 of Fig. 2; and,

Fig. 4 is a perspective view showing a wheel testing device, the adaptor and the wheel hub being omitted for the sake of clarity.

Referring now to the drawing for a better understanding of my invention, I show a wheel 10 mounted on a spindle 11 by suitable bearings 12. The wheel 10 is provided with a hub 13 having an outer end face 14 which is in the form of a machined transverse face normal to the axis of the spindle 11. The wheel 10 is secured in place on the spindle 11 by a washer 16 and a nut 17.

On some vehicle wheels, the washer 16 is of such a size that it will not enter the conventional opening 18 provided in a wheel testing device indicated generally at 19. The opening 18 is defined by the inner surface of a magnetic unit 21, which preferably is annular and is provided with a plurality of angularly spaced magnetic elements 22. The wheel testing device 19 is provided with the usual spirit levels 23, 24 and 25 for obtaining camber, caster and king pin inclination. As shown in Fig. 1, the washer 16 is of such a diameter that it engages the outer end face of the magnetic elements 22 of the wheel testing device 19.

My improved adaptor indicated generally at 26 comprises an annular member 27 formed of a non-magnetizable material, such as aluminum or the like. The annular member 27 is provided with a centrally disposed opening 20 which is of a size to receive the washer 16. Embedded within the non-magnetizable material 27 are angularly spaced magnetizable elements 28 which are in position to engage the magnetic elements 22 of the wheel testing device 19. That is, there is a magnetizable element 28 for each magnetic element 22 and the spacing between the magnetizable elements 28 is the same as that of the magnetic elements 22 whereby the magnetic elements 28 form extensions for the magnetic elements 22. The elements 28 are formed of a magnetizable material, such as iron. To add strength to the adaptor 26, I provide an outer metallic ring 29 which encases the periphery of the non-magnetizable member 27, as shown.

In order to anchor the magnetizable element 28 within the non-magnetizable member 27, threaded or serrated edges 31 are provided on the magnetizable elements 28 as shown in Figs. 2 and 3. Also, to anchor the metallic ring 29 firmly to the non-magnetizable member 27, the inner surface of the metallic ring 29 is threaded or serrated as at 30. By providing the threaded or serrated portions on the magnetizable element 28 and the metallic ring 29, the material forming the non-magnetizable member 27 flows into the threaded or serrated portions, thereby firmly locking the adjacent members to each other. As clearly shown in Fig. 3, the magnetizable elements 28 project outwardly of the non-magnetizable member 27 and are machined to form oppositely disposed faces which extend perpendicular to the axial center line of the adapter 26. Preferably, the magnetizable elements 28 project outwardly substantially .005 of an inch from the non-magnetizable member 27.

From the foregoing description, the operation of my improved adaptor will be readily understood. On spindle mounted wheels which are provided with washers 16 of a size to fit in the opening 18 of the wheel testing device 19, my improved adaptor is not needed. The magnetic elements 21 of the wheel testing gauge are then inserted against the machined outer face 14 of the hub 13 whereby the wheel testing device is supported in its entirety from the hub. On the other hand, with spindle mounted wheels having washers 16 which are too large in diameter to enter the opening 18 in the wheel testing device, my improved adaptor 26 is employed to form an extension for the wheel testing device. The magnetizable elements 28 are positioned opposite the magnetic elements 22 of the wheel testing device 19 whereby the magnetizable elements 28 form extensions for the magnetic elements 22. In view of the fact that the opening 20 forming the internal diameter of the non-magnetizable member 27 is greater than the external diameter of the washers 16, the adaptor 26 fits over the washers 16 and at the same time places the magnetizable elements 28 in direct contact with the magnetic elements 22 and the machined outer face 14 of the hub 13, as shown in Fig. 1. With the wheel testing device 19 thus mounted, the machined outer face of the magnetic elements 22 extend in a plane which is perpendicular to the axial center line of the spindle 11. It will be noted that the metallic ring 29 is of sufficient diameter to place it completely out of contact with the magnetic elements 22 and the hub 13. With the wheel testing device thus mounted, the readings in degrees of the camber, caster and king pin inclination of a vehicle wheel may be readily obtained in an accurate and efficient manner.

From the foregoing, it will be seen that I have devised an improved adaptor for use between the outer end face of the hub of a spindle mounted wheel and a plurality of angularly spaced magnetic elements carried by a wheel testing device for supporting the wheel testing device from the outer end face of the wheel hub. By providing the angularly spaced magnetizable elements which are carried by an annular non-magnetizable material, the magnetizable elements form extensions for the magnetic elements of the wheel testing device whereby there is practically no loss of magnetic power. At the same time a plurality of accurately machined surfaces are provided between the machined outer surface of the magnetic elements of the wheel testing device and the machined outer face of the wheel hub.

While I have described the non-magnetizable member 27 as being formed of aluminum, it will be apparent that other non-magnetizable materials may be employed, such as brass or the like.

Also, the adaptor 26 may be formed from powdered metals by a sintering process without the necessity of providing threaded or serrated edges between the magnetizable and non-magnetizable materials. The magnetizable elements 28 are first formed by placing a quantity of powdered iron under extreme pressure and then bonding the metal by heat treatment. The metallic outer ring 29 is placed in a suitable mold with the magnetizable elements 28 positioned in angularly spaced relationship to each other. Powdered brass or the like is added to the mold and sufficient pressure is applied to mold the adaptor into a single unit. Following the latter application of pressure the unit is bonded together by heat treatment.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

In an adaptor for use between a wheel testing device and the outer end face of the hub of a spindle mounted wheel having a retaining washer fitting over the spindle, the wheel testing device having a plurality of angularly spaced magnetic elements with outwardly disposed faces which lie in a common plane and the washer having an outer diameter less than the outer diameter of the outer end face of the hub and greater than the space between the angularly spaced magnetic elements, the improvement which comprises an annular, non-magnetizable plate-like member having an inner diameter greater than the outer diameter of the washer and less than the outer diameter of the outer end face of the hub and disposed to fit around said washer between said outer end face of the hub and said magnetic elements, a plurality of angularly spaced magnetizable elements carried by said non-magnetizable member, each of said magnetizable elements extending through and projecting outwardly from each side of said non-magnetizable member and having oppositely disposed faces on the projecting ends thereof extending perpendicular to the axial center line of said non-magnetizable member, said faces of said magnetizable elements on one side of said non-magnetizable member being adapted for alignment and direct contact with said magnetic elements on the wheel testing device to thereby form aligned extensions for said magnetic elements whereby the non-magnetizable member is held in spaced relation to said magnetic elements, the faces of said magnetizable elements on the other side of said non-magnetizable member being adapted for contact with the outer end face of the hub to thereby space the non-magnetizable member from said face of the hub whereby said magnetizable elements form the sole contact and support between the end face of the hub and the magnetic elements on the wheel testing device.

References Cited in the file of this patent

UNITED STATES PATENTS

| | | |
|---|---|---|
| 2,104,472 | St. Clair et al. | Jan. 4, 1938 |
| 2,501,803 | Witbrod | Mar. 28, 1950 |
| 2,645,860 | Bender et al. | July 21, 1953 |
| 2,729,896 | Rosenblum | Jan. 10, 1956 |